United States Patent
Girau et al.

(10) Patent No.: US 11,411,215 B1
(45) Date of Patent: Aug. 9, 2022

(54) ENGINEERED SOLID ELECTROLYTE INTERFACES ON ANODE MATERIALS

(71) Applicant: Advano, Inc., New Orleans, LA (US)

(72) Inventors: Alexander L. Girau, Metairie, LA (US); Shiva Adireddy, Slidell, LA (US)

(73) Assignee: Advano, Inc., New Orleans, LA (US)

( * ) Notice: Subject to any disclaimer, the term of this patent is extended or adjusted under 35 U.S.C. 154(b) by 131 days.

(21) Appl. No.: 16/106,078

(22) Filed: Aug. 21, 2018

Related U.S. Application Data

(60) Provisional application No. 62/548,162, filed on Aug. 21, 2017.

(51) Int. Cl.
| | |
|---|---|
| *H01M 4/36* | (2006.01) |
| *H01M 4/38* | (2006.01) |
| *H01M 4/62* | (2006.01) |
| *H01M 4/02* | (2006.01) |

(52) U.S. Cl.
CPC .......... *H01M 4/366* (2013.01); *H01M 4/364* (2013.01); *H01M 4/38* (2013.01); *H01M 4/625* (2013.01); *H01M 2004/027* (2013.01)

(58) Field of Classification Search
CPC .. H01M 10/0525; H01M 4/386; H01M 4/366; H01M 4/134; H01M 4/625; H01M 4/1395; H01M 2004/021; H01M 2004/027; H01M 10/052; H01M 4/387; H01M 4/364; H01M 4/587; H01M 4/133; H01M 4/0471; H01M 4/0404; H01M 4/621; H01M 4/1393; H01M 4/583; H01M 4/38; H01M 10/0569; H01M 4/62; H01M 4/624; H01M 4/382; H01M 10/058; H01M 4/622; H01M 10/0568; H01M 2300/0034; H01M 4/131; H01M 4/628; H01M 4/13; H01M 4/505; H01M 4/525; H01M 10/0565; H01M 4/0402; H01M 4/362; H01M 4/483; H01M 4/5815; H01M 4/661; H01M 2004/028; H01M 2220/20; H01M 2300/0037; H01M 4/04; H01M 4/0416; H01M 4/136; H01M 2300/004; H01M 2300/0082; H01M 4/663; H01M 4/667; H01M 4/80; H01M 10/0566; H01M 10/44; H01M 2004/025; H01M 2220/30; H01M 2300/0025; H01M 2/1673; H01M 4/0409; H01M 4/0414; H01M 4/0419; H01M 4/0428; H01M 4/0447; H01M 4/1391; H01M 4/405; H01M 4/42; H01M 4/463; H01M 4/623; H01M 4/666; H01M 4/70; H01M 4/8673; H01M 4/8803

See application file for complete search history.

(56) References Cited

U.S. PATENT DOCUMENTS

| | | | | |
|---|---|---|---|---|
| 8,962,183 | B2* | 2/2015 | Rayner | H01M 4/0492 216/13 |
| 9,012,079 | B2* | 4/2015 | Green | H01M 4/134 429/231.95 |
| 9,142,864 | B2* | 9/2015 | Roberts | H01M 4/386 |
| 9,252,426 | B2* | 2/2016 | Green | H01M 10/0525 |
| 9,812,699 | B2* | 11/2017 | Zhu | H01M 4/387 |
| 2010/0330425 | A1* | 12/2010 | Lopatin | H01M 4/1393 429/220 |
| 2013/0252101 | A1* | 9/2013 | Zhou | H01M 4/1395 429/231.5 |
| 2014/0170503 | A1* | 6/2014 | Yushin | H01M 10/0525 429/306 |
| 2014/0248543 | A1* | 9/2014 | Zhu | H01M 4/134 205/60 |
| 2015/0093636 | A1* | 4/2015 | Delpuech | H01M 4/483 429/188 |
| 2015/0093648 | A1* | 4/2015 | Son | B82Y 40/00 252/502 |
| 2015/0099187 | A1* | 4/2015 | Cui | H01M 10/052 429/231.8 |
| 2015/0325882 | A1* | 11/2015 | Yushin | H01M 10/052 429/341 |
| 2016/0218351 | A1* | 7/2016 | Dudney | H01M 4/366 |
| 2017/0346085 | A1* | 11/2017 | Suh | H01M 4/625 |
| 2018/0123124 | A1* | 5/2018 | Yang | H01M 10/0569 |
| 2018/0375089 | A1* | 12/2018 | Gonser | H01M 10/0567 |

FOREIGN PATENT DOCUMENTS

| | | | | |
|---|---|---|---|---|
| CN | 103238238 | * | 8/2013 | |
| CN | 103238238 A | * | 8/2013 | ............ H01M 4/387 |
| CN | 105406050 | * | 3/2016 | |
| WO | WO-2017093460 A1 | * | 6/2017 | ........ H01M 10/0525 |

\* cited by examiner

*Primary Examiner* — Kaity V Chandler

(74) *Attorney, Agent, or Firm* — Young Basile Hanlon & MacFarlane, P.C.

(57) ABSTRACT

Herein are described materials for a lithium ion anode, processes of manufacturing the lithium ion anode, and batteries that include the lithium ion anode. The materials can include a metal or metal alloy nanoparticulate carrying a solid electrolyte interface. The process can include admixing a lithium accepting material that is a metal or metal alloy nanoparticulate carrying a solid electrolyte interface with a conductive carbon; and then preparing a film of the admixture on an electrical substrate. The battery is assembled from the as manufactured lithium ion anode.

14 Claims, 1 Drawing Sheet

ENGINEERED SOLID ELECTROLYTE INTERFACES ON ANODE MATERIALS

CROSS-REFERENCE TO RELATED APPLICATIONS

This disclosure claims the benefit of priority to U.S. Provisional Application No. 62/548,162, filed Aug. 21, 2017, which is incorporated herein in its entirety.

FIELD OF THE INVENTION

This disclosure relates to compositions useful in rechargeable lithium ion batteries.

BACKGROUND

The lithium ion battery is a prime candidate for energy storage and use in electric vehicles (EV), renewable energy storage, and smart grid applications. These batteries often use graphite materials as the anode active material due to their relatively low cost and excellent rechargeability. However, the theoretical storage capacity of graphite is only 372 mAh/g (based on $LiC_6$), which limits the gravimetric and volumetric energy density of a battery cell. The emerging EV and renewable energy industries require rechargeable batteries with a significantly higher energy and power density than current Li ion battery technologies can provide. Accordingly, considerable efforts are spent on the research and development of electrode materials with higher specific capacity, excellent rate capability, and good cycle stability for lithium ion batteries.

In addition to carbon, several elements form alloys with Li within the desired voltage range. Therefore, anode materials based on such elements and some metal oxides (e.g., $SnO_2$) have been proposed for lithium ion batteries. Among these, silicon is considered the most promising since it has the highest theoretical specific capacity (up to 4,200 mAh/g based on $Li_{4.4}Si$) and a low discharge potential (i.e., high operation potential when paired with a cathode). However, silicon undergoes a dramatic volume change (up to 380%) during lithium ion alloying and de-alloying (cell charge and discharge). This volume change often leads to the pulverization of the Si, the loss of the electrical contact between the pulverized Si particles and the current collector, and performance degradation. Silicon further has a low intrinsic electric conductivity. Thus, many attempts have been made to improve the performance of Si-based anode materials, and although some anodes with specific capacities more than 1,000 mAh/g have been reported, it remains challenging to retain such high capacities over cycling (e.g., for more than 100 cycles) without significant electrode active material degradation.

SUMMARY

A first embodiment is a material for a lithium ion anode that includes a metal or metal alloy nanoparticulate carrying a solid electrolyte interface.

A second embodiment is a process for manufacturing a lithium ion anode that includes admixing a lithium accepting material comprising a metal or metal alloy nanoparticulate carrying a solid electrolyte interface with a conductive carbon; and then preparing a film or a pellet of the admixture on an electrical substrate.

A third embodiment is a lithium ion anode that includes a conductive substrate carrying an admixture of a lithium accepting material comprising a metal or metal alloy nanoparticulate carrying a solid electrolyte interface, a conductive powder, and, optionally, graphite and/or a binder.

BRIEF DESCRIPTION OF THE FIGURES

For a more complete understanding of the disclosure, reference should be made to the following detailed description and accompanying drawing figures wherein.

Figure 1:
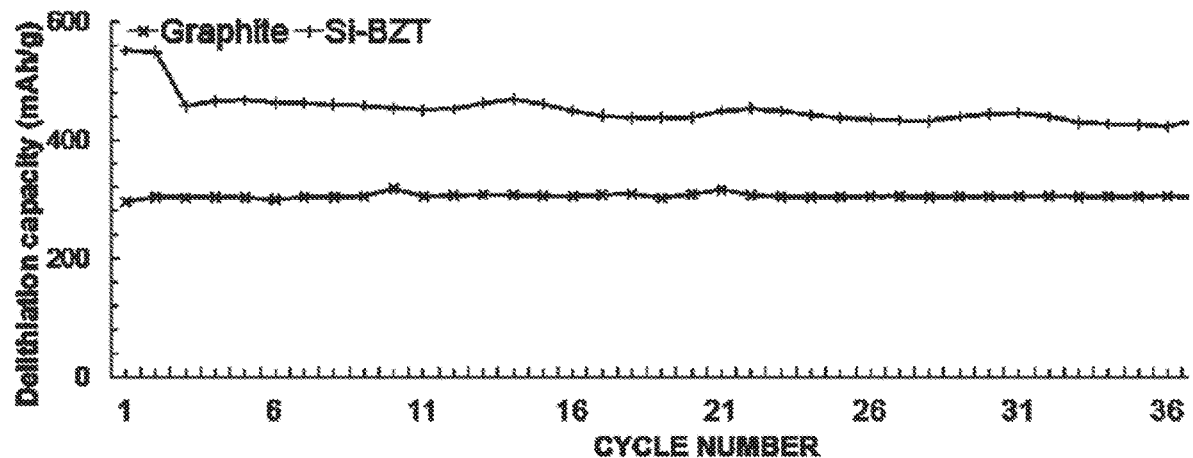
FIG. 1 is graph of discharge capacity for a battery assembled using a lithium ion anode utilizing a silicon nanoparticulate carrying a benzotriazole SEI.
Figure 2:
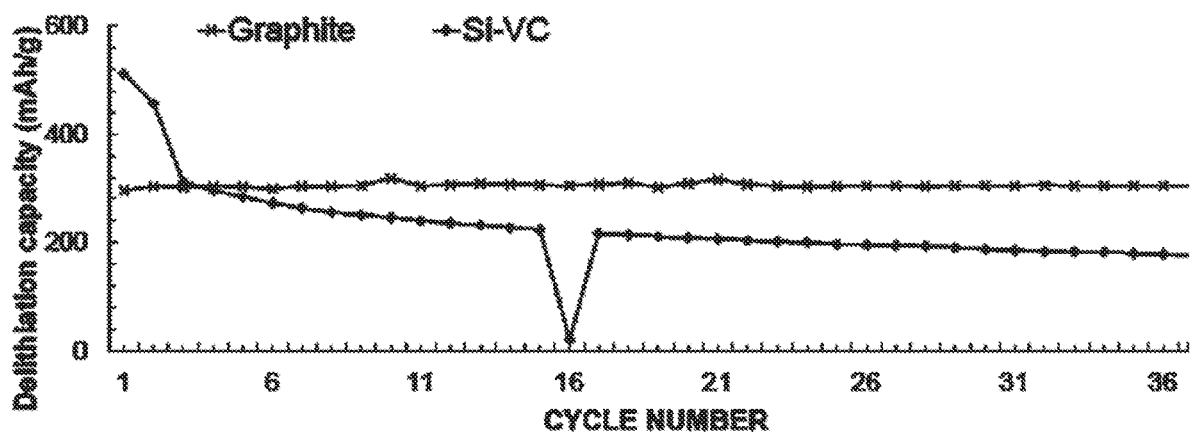
FIG. 2 is graph of discharge capacity for a battery assembled using a lithium ion anode utilizing a silicon nanoparticulate carrying a vinylene carbonate SEI.

While specific embodiments are illustrated in the figures, with the understanding that the disclosure is intended to be illustrative, these embodiments are not intended to limit the invention described and illustrated herein.

DETAILED DESCRIPTION

Objects, features, and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

Herein, the use of the word "a" or "an" when used in conjunction with the term "comprising" in the claims and/or the specification may mean "one," but it is also consistent with the meaning of "one or more," "at least one," and "one or more than one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

A first embodiment is a material for a lithium ion anode (i.e., a lithium accepting material). This material, preferably, includes a metal or metal alloy nanoparticulate carrying a solid electrolyte interface. As used herein a solid electrolytic interface (SEI) is an ion conducive material (layer) that is electrically insulating. One type of SEIs are the materials that are the result of, typically, a radical polymerization of liquid or polymeric electrolytes, often produced during the initial charging cycle(s) of a lithium ion battery. Herein, the SEIs can be the result of radical polymerization of compounds covalently bound to the surface of the nanoparticulate. Preferably, the SEIs are ionically conductive, electrically insulative, and composed of a compound, compounds, or a polymer derived therefrom covalently adhered to a surface of the nanoparticulate. More preferably, the SEI has an ionic conductivity of at least $10^{-6}$ S·cm$^{-1}$, at least $10^{-5}$ S·cm$^{-1}$, preferably at least $10^{-4}$ S·cm$^{-1}$.

Typically, the anode is coated with a SEI layer, whereas in this description, each nanoparticle is individually carrying a SEI. Herein, each nanoparticle is individually carrying and entirely coated (enwrapped, encased, or within) the SEI. Notably, this is distinct from a nanoparticulate material in a lithium ion battery wherein an SEI layer is deposited on the anode. Such a SEI layer on the anode, coats or is carried by the anode as a whole, not the individual nanoparticles. This can be, for example, be understood as a core-shell arrangement where the shell is a polymeric SEI. In one instance, the shell is the product of a radial polymerization of materials that are useful as electrolytes in lithium ion batteries (wherein the radical polymerization forms the polymeric SEI). In another instance, the shell is the product of the radical polymerization of vinylene carbonate (wherein the radical polymerization forms a polymeric vinylene carbonate SEI) and/or benzotriazole (wherein the radical polymerization forms a polymeric benzotriazole). In still another instance, the polymeric SEI is a vinylene carbonate polymer or a benzotriazole polymer. In a preferable instance, the polymeric SEI is cross-linked. In yet another preferable instance, the polymeric SEI is elastomeric.

In one example, the metal or metal alloy nanoparticulate carries a monolayer of the solid electrolyte interface. Herein, the term monolayer means a single layer of the composition or atoms that compose the solid electrolyte interface are disposed on the surface of the nanoparticulate. Depending on the orientation of the monolayer on the surface, the monolayer can have a thickness of about 3 Å to about 15 Å. In another instance, the material for the lithium ion anode consists essentially of, or consists of, the metal or metal alloy nanoparticulate carrying the monolayer of the solid electrolyte interface.

In one instance, the monolayer is composed of a cyclic compound having the formula $—C_2H_2O_2(CO)$ (or $—(CH)_2O_2(CO)$ depending on how the reader interprets chemical structure). Notably, the adjacent methenyl groups (CH) are bound to the surface of the nanoparticulate. In another instance, the monolayer is composed of a plurality of cyclic bi-radical groups bound to a surface of the metal or metal alloy nanoparticulate.

In another example, the particulate carries a monolayer of the vinylene carbonate on the particulate surface (that is, the solid electrolyte interface is composed of a vinylene carbonate). In one instance, the surface of the particulate includes silicon atoms, and wherein the vinylene carbonate is bound to at least two, proximal silicon atoms. In a preferable instance, the material is free of silicon-oxygen bonds as determined by IR spectroscopy. In another instance, the particulate is free of silicon-oxygen bonds as determined by IR spectroscopy. More preferably, the material is free of silicon-oxygen bonds; even more preferably, the particulate is free of silicon-oxygen bonds. In another instance, the surface of the particulate includes germanium atoms, and wherein the vinylene carbonate is bound to at least two, proximal germanium atoms. In a preferable instance, the material is free of germanium-oxygen bonds as determined by IR spectroscopy. In another instance, the particulate is free of germanium-oxygen bonds as determined by IR spectroscopy. More preferably, the material is free of germanium-oxygen bonds; even more preferably, the particulate is free of germanium-oxygen bonds. In yet another instance, the surface of the particulate includes atoms of the metal, and wherein the vinylene carbonate is bound to at least two, proximal atoms of the metal.

Notably and as used herein, the term vinylene carbonate has two meanings as well understood by those in the art; first, vinylene carbonate refers to the organic compound (CAS Number 872-36-6) that is also known as 1,3-Dioxol-2-one, second, vinylene carbonate refers to the product of a 1,2-radical addition across the vinylene double bond. While, proper organic nomenclature does not support this naming of the addition product, the name of the originating alkene (or alkyne) is often used to designate the product when the use of the name of the resulting alkane (or alkene) is confusing. Accordingly, vinylene carbonate bound to a surface is understood to be the product of an addition reaction between the surface and the organic compound (preferably a 1,2-addition reaction between radicals on the surface and the vinylene group).

In yet another example, the particulate carries a monolayer of the benzotriazole on the particulate surface (that is, the solid electrolyte interface is composed of a benzotriazole). In one instance, the surface of the particulate includes silicon atoms, and wherein the benzotriazole is bound to at least two, proximal silicon atoms. In a preferable instance, the material is free of silicon-oxygen bonds as determined by IR spectroscopy. In another instance, the particulate is free of silicon-oxygen bonds as determined by IR spectroscopy. More preferably, the material is free of silicon-oxygen bonds; even more preferably, the particulate is free of silicon-oxygen bonds. In another instance, the surface of the particulate includes germanium atoms, and wherein the benzotriazole is bound to at least two, proximal germanium atoms. In a preferable instance, the material is free of germanium-oxygen bonds as determined by IR spectroscopy. In another instance, the particulate is free of germanium-oxygen bonds as determined by IR spectroscopy. More preferably, the material is free of germanium-oxygen bonds; even more preferably, the particulate is free of germanium oxygen bonds. In yet another instance, the surface of the particulate includes atoms of the metal, and wherein the benzotriazole is bound to at least two, proximal atoms of the metal.

The nanoparticulate is, preferably, made of a metal or a metal alloy, optionally the nanoparticulate can consist essentially of or consist of the metal or metal alloy. In one preferable instance, the nanoparticulate consists of the metal or metal alloy. As used herein the metal alloy includes the metal; that is, the metal alloy is a combination of the metal and one or more alloying elements. In one particularly preferable instance, the metal is selected from silicon, germanium, tin, and a combination thereof. Notably, as used herein silicon, germanium, and tin are the preferred metal components for both the metal and the metal alloy, accordingly combinations thereof, while technically alloys of these components, are not considered the herein termed metal alloys as the composition would not include a, herein defined, alloying element. In a preferred example, the metal or metal alloy is silicon or a silicon alloy; that is the nanoparticulate is preferably silicon or a silicon alloy. More preferably, the nanoparticulate is, consists essentially of, or consists of silicon.

When the nanoparticulate is a metal alloy, an alloying element is included. In one instance, the metal alloy is a binary alloy that includes the metal and one alloying element. In another instance, the metal alloy is ternary alloy that includes the metal and two alloying elements. Notably, the inclusion of elements under 1 wt. % in the metal or metal alloy are not expressed herein. That is, the composition of the nanoparticulate must include greater than 1 wt. % of an alloying element for the composition to be considered an alloy. In one example, the alloying element is selected from those elements that form solid solutions with the metal (i.e., silicon, germanium, and/or tin). In another example, the alloying element is selected from titanium, iron, chromium, magnesium, manganese, cobalt, nickel, and gallium. In one instance, one alloying element is selected from titanium and iron (e.g., in a binary alloy the alloying element is selected from Ti and Fe; in a ternary alloy the alloying element includes one selected from Ti and Fe). In a preferable example, the metal alloy can be a Si—Ti alloy or a Fe—Si alloy. Preferably, the Si—Ti alloy or the Fe—Si alloy is a solid solution. In another example, the composition of the metal alloy includes intermetallic species or consists of intermetallic species.

The electrode is particularly useful in lithium ion batteries and as such the lithium adsorptive (e.g., chemabsorptive) material will often include a significant percentage of lithium. While the inclusion of lithium into the particulate can yield a solid solution, herein, the composition of the particulate, as a metal or metal alloy, is disclosed separate from the lithiated species. Accordingly, the particulate can be a lithiated metal or a lithiated metal alloy (i.e., a metal or metal alloy the includes lithium).

The nanoparticulate has a cross-sectional diameter. The cross-sectional diameter, preferably, has a length between about 10 nm, 25 nm, 50 nm, 75 nm, 100 nm, or 250 nm and about 250 nm, 500 nm, 750 nm, 1 µm, or 2 µm. In another instance, the cross-sectional diameter can have a length between about 10 nm, 20 nm, 30 nm, 40 nm, 50 nm, 60 nm, 70 nm, 80 nm, 90 nm, or 100 nm and about 100 nm, 110 nm, 120 nm, 130 nm, 140 nm, 150 nm, 160 nm, 170 nm, 180 nm, 190 nm, 200 nm, 225 nm, or 250 nm. In still another instance, the cross-sectional diameter can have a length of about 10 nm, 20 nm, 30 nm, 40 nm, 50 nm, 60 nm, 70 nm, 80 nm, 90 nm, 100 nm, 100 nm, 110 nm, 120 nm, 130 nm, 140 nm, 150 nm, 160 nm, 170 nm, 180 nm, 190 nm, 200 nm, 225 nm, or 250 nm.

Another embodiment is a process for manufacturing a lithium ion anode and by extension a lithium ion battery. The process for manufacturing the anode can include admixing a lithium accepting material comprising a metal or metal alloy nanoparticulate carrying a solid electrolyte interface (i.e., that material described above) with a conductive carbon. Notably, herein the SEI is coated or carried on the nanoparticulate whereas the conductive carbon is not coated with the SEI. The process can then include preparing a film of the admixture on an electrical substrate.

Herein, the process can include admixing the lithium accepting material with the conductive carbon in a ratio from 20:1 to 1:2, from 18:1 to 1:2, from 16:1 to 1:2, from 15:1 to 1:2, from 15:1 to 2:3, from 25:2 to 2:3, from 10:1 to 2:3, or preferably from 10:1 to 1:1. In one instance, the conductive carbon comprises graphene, carbon black, single-wall carbon nanotubes, multi-wall carbon nanotubes, carbon nanotube sponge, or mixtures thereof.

Herein, conductive carbon can be selected from carbon black, graphene, carbon nanotubes, and a mixture thereof. In one example, the conductive carbon includes carbon black; in another example, the conductive carbon includes graphene; in another example, the conductive carbon includes carbon nanotubes. The conductive carbon can further be an incompletely carbonized form of carbon. The conductive material can alternatively be metal or metallic materials that do not absorb lithium. In one instance, the electrode includes about 1 wt. % to about 40 wt. % of the conductive carbon. For example, the electrode can include about 2-5 wt. %, about 5-10 wt. %, about 10-20 wt. %, about 20-30 wt. %, or about 30-40 wt. % of the conductive carbon.

In another instance, the film can include about 1 to about 50 wt. % of the conductive carbon, about 1 to about 95 wt. % of the lithium accepting material, and about 1 to about 10 wt. % of a binder. In still another instance, the lithium accepting material and conductive carbon are further admixed with graphite. In an example wherein the lithium accepting material and conductive carbon are admixed with graphite, the film comprises about 10-90 wt. % lithium accepting material, about 1-40 wt. % conductive carbon, about 10-80 wt. % graphite, and about 1-10 wt. % binder. In another example, the film can include about 70-80 wt. % graphite and about 1-10 wt. % conductive carbon.

A third embodiment is an anode for a lithium ion battery. The anode can include a layer or film, preferably carried on a conductive substrate (e.g., copper or other foil), that includes the above described lithium accepting material and a conductive powder (e.g., conductive carbon or another electrically conductive powder or material (e.g., copper powder)). The anode can further include a binder and/or graphite. Notably, the anode film or layer includes a lithium accepting material that carried on each nanoparticulate a SEI layer. Accordingly, the anode layer of film has a composite structure wherein the SEI layer is individually carried by the nanoparticulate as opposed to standard lithium ion batteries wherein an SEI forms over the entire anode during cycling. Preferably, the concentration of the SEI is consistent across the thickness of the anode layer or film.

The foregoing description is given for clearness of understanding only, and no unnecessary limitations should be understood therefrom, as modifications within the scope of the invention may be apparent to those having ordinary skill in the art. While the compositions and methods of this invention have been described in terms of preferred embodiments, it will be apparent to those of skill in the art that variations may be applied to the compositions and/or methods in the steps or in the sequence of steps of the method described herein without departing from the concept, spirit and scope of the invention. More specifically, it will be apparent that certain agents that are both chemically and physically related may be substituted for the agents described herein while the same or similar results would be achieved. All such similar substitutes and modifications apparent to those skilled in the art are deemed to be within the spirit, scope and concept of the invention as defined by the appended claims.

What is claimed:

1. A material for use in a lithium ion anode consisting of: a plurality of silicon nanoparticulates, each nanoparticulate individually carrying and entirely coated with a
   solid electrolyte interface,
   wherein the silicon nanoparticulates include silicon or a silicon alloy, and wherein the silicon alloy and/or the silicon and the solid electrolyte interface are free of silicon oxygen bonds,
   wherein the nanoparticulate carries a monolayer of the solid electrolyte interface, and wherein the solid electrolyte interface is composed of a plurality of bi-radical groups bound to a surface of the nanoparticulate by adjacent methenyl groups, a vinylene carbonate, or a benzotriazole.

2. The material of claim 1, wherein the solid electrolyte interface has an ionic conductivity of at least 10-6S·cm−1.

3. The material of claim 1, wherein the nanoparticulate includes the silicon alloy, and wherein the silicon alloy includes an alloying element selected from titanium, iron, chromium, magnesium, manganese, cobalt, nickel, and gallium.

4. The material of claim 1, wherein the nanoparticulate has a cross-sectional diameter between about 25 nm and 1 µm.

5. A process for manufacturing a lithium ion anode comprising:
   admixing the material of claim 1 with a conductive carbon;
   preparing a film of the admixture on an electrical substrate.

6. The process of claim 5, wherein the material of claim 1 is admixed with the conductive carbon in a ratio from 20:1 to 1:2.

7. The process of claim 6, wherein the ratio is from 10:1 to 1:1.

8. The process of claim 5, wherein the film comprises about 1 to about 50 wt. % of the conductive carbon, about 1 to about 95 wt. % of the material of claim 1, and about 1 to about 10 wt. % of a binder.

9. The process of claim 5, wherein the material of claim 1 and conductive carbon are further admixed with graphite.

10. The process of claim 5, wherein the film comprises about 10-90 wt. % material of claim 1, about 1-40 wt. % conductive carbon, about 10-80 wt. % graphite, and about 1-10 wt. % binder.

11. The process of claim 5, wherein the film includes about 70-80 wt. % graphite and about 1-10 wt. % conductive carbon.

12. A lithium ion anode comprising:
a conductive substrate carrying an admixture of a material, the material consisting of:
a plurality of silicon nanoparticulates, each nanoparticulate individually carrying and entirely coated with a solid electrolyte interface, wherein the silicon nanoparticulates include silicon or a silicon alloy, and wherein the silicon alloy and/or the silicon and the solid electrolyte interface are free of silicon oxygen bonds,
a conductive powder, and,
graphite and/or a binder,
wherein the lithium ion anode has a structure of a solid composite,
wherein the nanoparticulate carries a monolayer of the solid electrolyte interface,
and wherein the solid electrolyte interface is composed of a plurality of bi-radical groups bound to a surface of the nanoparticulate by adjacent m ethenyl groups, a vinylene carbonate, or a benzotriazole.

13. The material of claim 1, wherein the solid electrolyte interface is the product of radical polymerization.

14. The material of claim 13, wherein the solid electrolyte interface is crosslinked.

\* \* \* \* \*

UNITED STATES PATENT AND TRADEMARK OFFICE
CERTIFICATE OF CORRECTION

PATENT NO.         : 11,411,215 B1
APPLICATION NO.    : 16/106078
DATED              : August 9, 2022
INVENTOR(S)        : Alexander L. Girau and Shiva Adireddy It is certified that error appears in the above-identified patent and that said Letters Patent is hereby corrected as shown below:

In the Claims

Claim 12 Column 8 Line 15; Replace "m ethenyl groups" with "methenyl groups"

Signed and Sealed this
Seventeenth Day of January, 2023

Katherine Kelly Vidal
*Director of the United States Patent and Trademark Office*